3,374,279
ALKYLATION PROCESS
David G. Walker, Madison, N.J., assignor to
Esso Research and Engineering Company
No Drawing. Filed Dec. 30, 1965, Ser. No. 517,857
9 Claims. (Cl. 260—671)

The present invention relates to the alkylation of aromatic hydrocarbons in the presence of a soluble catalyst. More particularly, the present invention relates to the reaction, in the substantial absence of water and molecular oxygen, of an alkylatable aromatic hydrocarbon and an olefin in the presence of a catalytically effective amount of a soluble, crystalline complex having molar ratios as shown in the empirical formula:

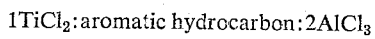
1TiCl$_2$:aromatic hydrocarbon:2AlCl$_3$

Catalytic alkylation of alkylatable aromatic hydrocarbons is well known. However, the catalysts which are most commonly employed are not soluble in the reaction mass and give rise to real problems of material handling. The present invention employs as a catalyst a soluble, crystalline complex which is easily handled in solution, using the alkylatable aromatic hydrocarbon as a solvent.

As has been stated above, the catalyst of the present invention has a formula which represents a complex between titanium dichloride, an aromatic hydrocarbon, and aluminum chloride. While the empirical formula is useful in expressing the approximate molar relationship between its constituents, it is to be understood that applicant does not represent the empirical formula to be illustrative of the actual molecular structure of the catalyst. There is some evidence which indicates the molecular structure to be of the formula:

[Ti(aromatic hydrocarbon)]$^{+2}$[AlCl$_4$]$_2$$^{-1}$

The empirical formula, however, is useful in identifying the catalyst for the purposes of this application.

In preparing the complex, the aromatic hydrocarbon can be benzene or alkyl-substituted benzenes, such as toluene, xylene, ethylbenzene, etc., but there must be two unsubstituted carbons in the benzene ring. Toluene has been established by experiment to be an effective aromatic hydrocarbon for use in the complex. (See Examples 2 and 3.) The complex can be prepared from titanium tetrachloride and aluminum powder, or from the cocrystallized product of titanium trichloride and aluminum chloride in the ratio: 1TiCl$_3$:1/3AlCl$_3$. Preparation of complexes such as that of the present catalyst was discussed by Martin and Vorwinkel in Ber., 1961, pp. 2416–2429.

Alkylatable aromatic hydrocarbons which can be used in the present process include benzene, toluene, xylene, hemimellitene, pseudocumene, the naphthalene series of aromatic hydrocarbons, etc. Any aromatic hydrocarbon can be alkylated so long as it has an unsubstituted carbon and so long as steric hindrance does not prevent alkylation with the particular olefin chosen for use in the process.

The olefins which may be employed include alpha and internal olefins, such as ethylene, propylene, butene-1, butene-2, isobutylene, pentene-1, pentene-2, hexene-1, hexene-2, hexene-3, 3-methyl-1-butene, 3-methyl-1-pentene, etc.

The process itself is carried out in the liquid phase utilizing a small but catalytically effective amount of the complex above described, having an empirical formula of TiCl$_2$:aromatic hydrocarbon:2AlCl$_3$. The complex can be used in amounts from 0.05% to 5.0% by weight (based on the alkylatable aromatic hydrocarbon), but 1% by weight concentration is preferred since this gives very fast alkylation without leaving an unreasonable amount of residue in the product.

The pressure can be atmospheric and is not critical so long as some of the olefin can be kept dissolved in the liquid aromatic phase. Thus, the pressure should be correlated with the temperature at which the reaction is being carried out in order both to maintain the aromatic hydrocarbon in the liquid phase and to maintain a sufficient amount of olefin dissolved therein to allow the alkylation reaction to proceed. The pressure can suitably range from 3 p.s.i.a. to 300 p.s.i.a., but atmospheric pressure is preferred because of the simplicity of operations under atmospheric conditions.

The temperature preferably is room temperature. If the alkylatable aromatic hydrocarbon solidifies or is too viscous at room temperature, elevated temperatures (such as 100° C.) may be employed in order to maintain it in the liquid state. At low temperatures, the rate of alkylation drops to an undesirable low or the alkylatable aromatic hydrocarbon may solidify. A practical lower limit is −50° C.

The alkylation reaction is extremely rapid at room temperature, and thus the residence time in the reaction zone is not critical. The reaction seems to be mass transfer limited and, thus, the time to be employed would appear to depend on the efficiency of the mixing system. A suitable time period is from 0.01 minute to 10 minutes.

It is important to maintain the reaction system free of water and molecular oxygen, since either water or molecular oxygen will deactivate the catalyst.

In order to illustrate the production of the catalyst and its use, the following examples are given.

*Example 1.—Synthesis from TiCl$_3$·1/3AlCl$_3$*

TiCl$_3$·1/3AlCl$_3$ (0.083 mol) and Al° powder (0.37 g.-atom) were combined with 200 ml. benzene and left refluxed overnight under nitrogen atmosphere. The resulting solution was filtered and saved under nitrogen blanket. A 5 ml. aliquot contained 0.4985 g. non-volatile matter (≅10 wt. percent) which was analyzed by wet chemical methods to yield:

TABLE I

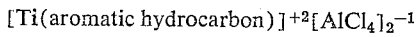

|  | g. | Wt. percent | Wt. percent Calc. for TiCl$^2$ (benzene) 2 AlCl$_3$ |
|---|---|---|---|
| Ti | 0.0546 | 10.92 | 10.33 |
| Al | 0.0662 | 13.3 | 16.4 |
| Cl | 0.3210 | 64.5 | 61.18 |
| Benzene (IR) | | 12.3 | 12.1 |

Calc. yield=16 g. product (92% of theoretical).

*Example 2.—Synthesis from TiCl$_4$*

TiCl$_4$ was redistilled under nitrogen, B.P. 135° C. to 136° C. (uncorrected). Al$_2$Cl$_6$ was sublined under nitrogen. Al° powder was treated with 6 weight percent aluminum triethyl in xylene, then washed several times with isooctane and vacuum-dried one hour at 25° C. Toluene was nitrogen purged before use.

TiCl₄ (0.182 mol), AlCl₃ (0.256 mol), Al° powder (1.11 g. atoms), and 325 of toluene were combined in a stirred flask and left under reflux overnight. The reaction mixture was filtered, hot diluted with 150 ml. *n*-heptane, and a precipitate occurred at once. The solution was cooled to −78° C. and left for two hours. The resulting large purple crystals were filtered and washed twice with n-hexane. Yield: 60 to 70 g. (75% of theory).

Analysis:

TABLE II

|  | Crystalline Wt. percent Product | Wt. percent Calc. for TiCl₂ (toluene) 2AlCl₃ |
|---|---|---|
| Ti | 10.9 | 10.0 |
| Al | 11.7 | 11.3 |
| Cl | 58.3 | 59.4 |
| Toluene | 19.1 | 19.2 |

The compound was diamagnetic.

*Example 3.—Alkylation of xylene with propylene*

Five ml. of a 1.17 weight percent solution in xylene of TiCl₂ (toluene) 2AlCl₃ was placed in a propylene atmosphere at 25° C. and essentially at atmospheric pressure. Water and air were excluded from the reaction zone. Propylene (in the amount of 1408 std. ml. of gas 0.058 mol) rapidly reacted before reaction ceased. Infrared and NMR analyses of the residual product showed the xylene to be completely alkylated (i.e., at least one propylene was reacted onto each xylene molecule) and the product to consist of substitution only of isopropyl groups (from the propylene) and methyl groups (originally present).

Propylene was converted in the alkylation reaction to the extent of about 1.5 mols of propylene to per mol of xylene. Analysis of the residue showed that the catalyst residue was of composition Ti/Al/Cl in a 1/2/8 mol ratio, which was essentially the same (within experimental error) as in the original catalyst.

Having disclosed the present invention in detail, including a preferred mode of carrying out the process of the present invention, what is intended to be covered by Letters Patent should be limited not by the specific examples herein given but rather by the appended claims.

I claim:
1. A method which comprises
   contacting in the liquid phase an alkylatable aromatic hydrocarbon with an olefin
   in a reaction zone which is substantially free of water and molecular oxygen,
   and in the presence of an effective amount of a catalyst dissolved in said aromatic hydrocarbon,
   said catalyst consisting of a crystalline complex having the empirical formula

1TiCl₂:1 aromatic hydrocarbon:2AlCl₃

2. A method as set forth in claim 1 wherein the residence time in said reaction zone of said alkylatable aromatic hydrocarbon is from 0.01 minute to 10 minutes.
3. A method as set forth in claim 1 wherein the temperature in said reaction zone is within the range from −50° C. to +100° C.
4. A method as set forth in claim 1 wherein the catalyst has the empirical formula:

1TiCl₂:1 toluene:2AlCl₃

5. A method as set forth in claim 1 wherein the olefin is propylene.
6. A method as set forth in claim 1 wherein the alkylatable aromatic hydrocarbon is at least one of the isomeric xylenes.
7. A method as set forth in claim 1 wherein the temperature is about 20° C. and the pressure in said reaction zone is substantially atmospheric pressure.
8. A method as set forth in claim 1 wherein the catalyst has the empirical formula:

1TiCl₂:benzene:2AlCl₃

9. A method which comprises
   contacting in the liquid phase at least one of the isomeric xylenes with propylene,
   in a reaction zone which is substantially free of water and molecular oxygen,
   and in the presence of an effective amount of a catalyst dissolved in said aromatic hydrocarbon,
   said catalyst consisting of a crystalline complex having the empirical formula 1TiCl₂:1 toluene:2AlCl₃ said contacting being carried out at atmospheric pressure and at a temperature from −50° C. to +100° C.

References Cited

UNITED STATES PATENTS

| 2,404,235 | 7/1946 | Krarasch | 260—671 |
| 3,114,781 | 12/1963 | Reed | 260—671 |
| 3,284,524 | 11/1966 | Calcagno | 260—671 |

DELBERT E. GANTZ, *Primary Examiner.*

C. R. DAVIS, *Assistant Examiner.*